United States Patent [19]
Fielder

[11] 3,766,931
[45] Oct. 23, 1973

[54] DENTAL FLOSS TOOL
[76] Inventor: Foreman F. Fielder, R.R. No. 2, Beatrice, Nebr. 68310
[22] Filed: Aug. 14, 1972
[21] Appl. No.: 280,124

[52] U.S. Cl............................................. 132/92 A
[51] Int. Cl........................................... A61c 15/00
[58] Field of Search...................... 132/91, 90, 92 A, 132/92 R

[56] References Cited
UNITED STATES PATENTS
3,289,681  12/1966  Chambers........................ 132/92 R
2,554,526   5/1951  Dembenski ..................... 132/92 R Primary Examiner—Louis G. Mancene
Assistant Examiner—Gregory E. McNeill
Attorney—Harvey B. Jacobson

[57] ABSTRACT

For use in holding and dispensing dental floss wound on a spool, an improved tool characterized by a body constituting a handle and having forward and rearward ends, side surfaces, and top and bottom longitudinal surfaces. Manually squeezable tines are mounted on project beyond the forward end and have free ends with which a portion of the dental floss is adjustably connected and held taut for use. A recessed pocket in the rear end serves to accommodate an insertable rotatable spool. An adapter clip serves to position and hold the spool in place.

6 Claims, 5 Drawing Figures

PATENTED OCT 23 1973 3,766,931
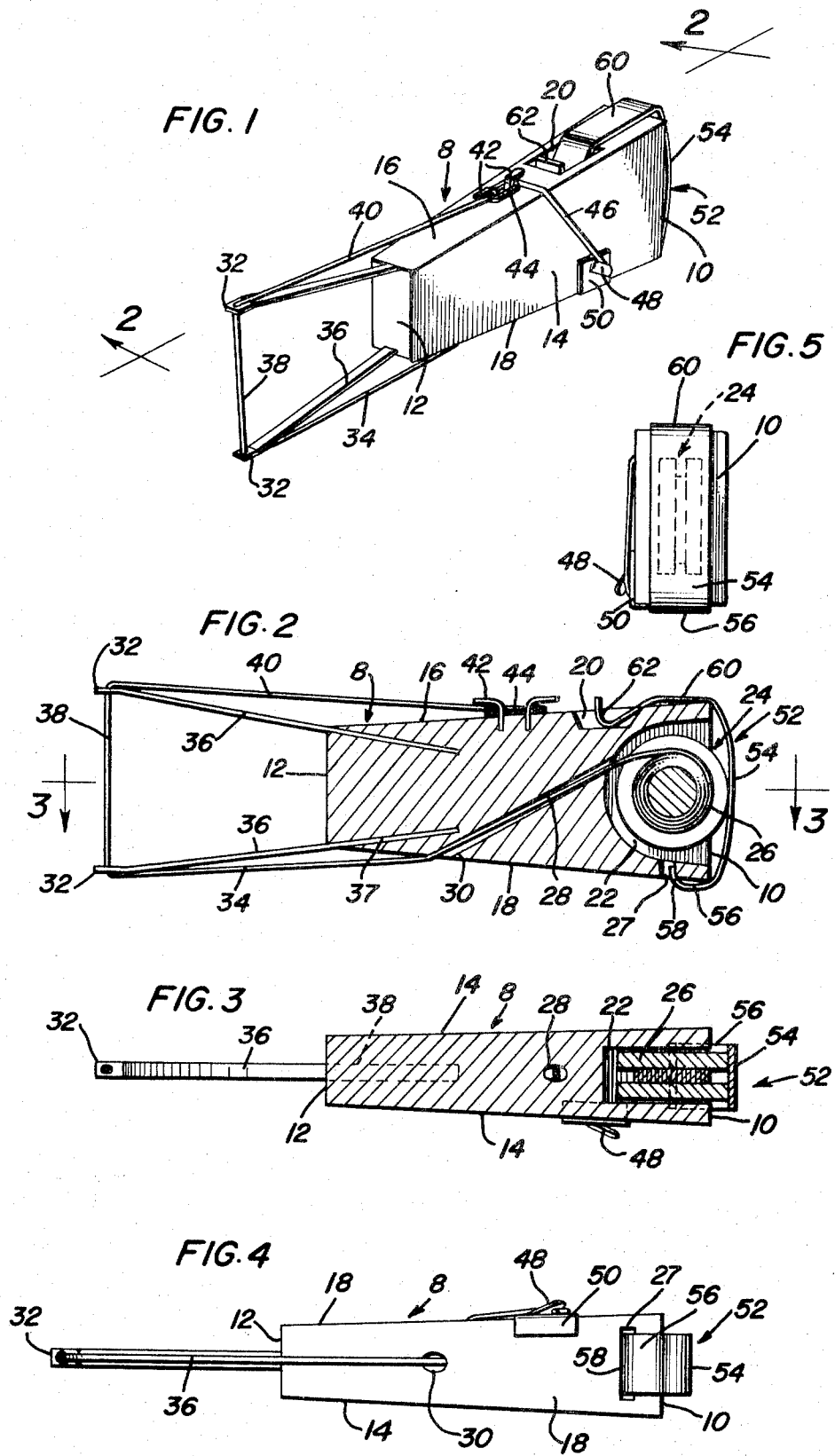

DENTAL FLOSS TOOL

The present invention relates to certain new and useful improvements in tools and implements which are expressly designed and adapted to store, guidingly hold and retentively anchor the free withdrawable end portion of the dental floss.

Many and varying tools, implements and devices have been devised for cleaning teeth and stimulating gum areas between the teeth and which utilize dental floss which is withdrawn and dispensed in one manner or another for feasibly acceptable use. As a general rule, a body which constitutes a handle and which has dental floss holding means and tautening fork-like tines and fingers are compactly utilized. An object of the present invention is to advance this line of endeavor through the medium of a structurally and novelly improved instrumentality which is not only convenient and comfortable to use but achieves desired end results in an approved and acceptable manner.

For background purposes reference may be made to J. B. Kirby's Tooth-Cleaning and Massaging Device disclosed in U.S. Pat. No. 3,368,553 wherein a tubular member for receiving a spool of dental floss is utilized for expedient withdrawable use. A somewhat simpler but broadly analogous tooth cleaning implement is shown in a U.S. Pat. issued to E. C. Chambers No. 918,281. A more complicated but applicably analogous dental floss holder is shown in O. S. Chambers, U.S. Pat. No. 3,289,681.

Briefly the dental floss spool holding tool therein more explicitly set forth utilizes an elongated generally rectangular body made of plastic or equivalent material and functions as a conveniently grippable and manipulatable handle and is characterized by forward and rearward ends, substantially planar or flat side surfaces, and narrower top and bottom longitudinal surfaces. The forward end is provided with a pair of non-corrodible resilient tines which are in opposed properly projecting relationship and have rear end portions securely embedded in the forward part of the body. These forwardly projecting tines are bendably resilient and can be squeezed together for temporarily slackening the tension on the dental floss and thereafter released to tauten and place the in-between floss under ready-to-use tension. The rearward end has a rearwardly opening recess providing a pocket for reception of an insertable and removable rotatably supported spool carrying dental floss which can be readily payed out for use. The body portion has a suitably angled passage for the dental floss leading from the pocket or recess through a bottom edge of the body. The dental floss can then be connected with the free ends of the bendable tines, connected with angular anchoring cleats after which a terminal end portion can be applied to a cutting element for disposition, that is, when it is ready to be discarded. The rear end of the spool pocket is provided with a bodily attachable and detachable U-shaped or equivalent adapter clip.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in perspective of a dental floss tool constructed in accordance with the principles of the present invention and rigged for use.

FIG. 2 is a central longitudinal sectional view with parts in section and elevation taken approximately on the plane of the section line 2—2 of FIG. 1 looking in the direction of the indicating arrows.

FIG. 3 is a view at right angles also in longitudinal section but taken on the section line 3—3 of FIG. 2.

FIG. 4 is a bottom plan view.

FIG. 5 is a rear end elevation looking at FIGS. 1 or 2, for example, in a direction from right to left.

The aforementioned elongated generally rectangular body, which may be made of appropriate moldable colorful plastic material, is denoted by the numeral 8. This body is of requisite dimensions in longitudinal and transverse cross section that it may be safely and reliably held in the hand of the user. The body if desired may taper in cross-sectional dimension from the generally flat vertical rearward end 10 to the correspondingly flat forward end 12. The normal vertical sides or side surfaces are denoted at 14, the longitudinal top surface or edge being denoted at 16 and the underlying or bottom longitudinal edge at 18. The rearward half portion of the upper longitudinal edge 16 is provided with a suitably shallow and shaped depression 20 which serves a purpose to be later described. The rearward end portion is provided with an appropriately shaped recess 22 which provides a pocket for the insertable, removable and rotatable spool 24, that is, the spool which carries the supply of dental floss 26. The spool is so mounted that a segmental portion protrudes slightly beyond the plane of the surface 10. It will be noted, particularly in FIG. 2, that the aforementioned depression 20 is in a plane above and slightly forwardly of the closed end of the pocket or recess 22. On the underneath or bottom side there is a suitably positioned and proportioned kerf or notch 27 which serves as a keeper seat. The portion of the dental floss which is unwound and partly payed out is denoted at 28 in FIG. 2 and is withdrawable through a diagonal passage 30 which leads from the recess 22 through the bottom surface 18 to provide the usable end portion of the dental floss.

For best results it has been found that non-corrodible plastic, stainless steel or appropriately manually bendable tines serve for positioning and presenting the dental floss for practical use. Two tines are employed and are directed beyond the forward end 12 in normal diverging relationship. The free terminal ends are provided with apertures, that is the end portions 32. In actual practice it would be within the purview of the invention to provide guiding notches (not shown) instead of holes for passage of the associated dental floss. In any event a portion of the dental floss 34 is threaded not only through the passage 30 but threaded through the openings in the fork tines 36 whose end portions 37 are embedded and anchored in the body portion 8. That portion of the dental floss which is used between the teeth and for massaging and acting on the user's gums is denoted at 38. The next adjacent portion 40 is directed rearwardly and is wrapped and adapted to be tied and anchored around a pair of L-shaped anchoring cleats 42 and the wrapped portion of the dental floss is designated at 44. A terminal end portion which can be discarded after use is connectible with a cutting blade 48 provided on the L-shaped or equivalent anchor clip 50.

Referring again to the spool holding and positioning means, this component, as already suggested, comprises a bodily attachable and securely retainable bridle or adapter 52. This adapter comprises a strap of plastic or suitable non-corrodible metal which is generally U-shaped in configuration, the curved bight portion 54 bridging the end portion 10 and also a segment of the spool 24. The lower end portion 56 is fashioned into a keeper hook 58 which can be releasably snapped into the keeper seat 27. The retaining arm at the top as best shown in FIGS. 1 and 2 is denoted at 60 and is forwardly directed and terminates in an appropriately bent and accessibly grippable part which is referred to as a latch 62. This latch is removably seatable in the latch accommodating depression 20.

Experience has shown that a dental floss storing, supporting and using tool or implement as herein shown and described is structurally and functionally simple, well serves the purposes for which it has been devised and is such in construction and capability that it will meet with the manufacturing requirements of manufacturers and the ordinary needs of users.

The manner in which the floss containing spool 24 is pocketed and then clipped in place for replacement is evident from the views of the drawing. The construction and manner in which the spool assembling and retaining clip is used is also believed to be substantially self-evident. Then, too, the manner in which the dental floss can be threaded (with the aid of a darning needle if desired) is substantially self-evident. Under the circumstances, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A dental floss holding and using tool comprising: an elongated body shaped to provide a conveniently grippable and manipulatable handle and having forward and rearward ends, side surfaces, and top and bottom longitudinal surfaces, a pair of tines projecting forwardly beyond said forward end and having rearward end portions embedded and secured in said forward end, said tines being bendably resilient and having terminal free ends, the rearward end of said body having a rearwardly opening recess providing a pocket for reception and retention of an insertable and removable rotatably supported spool of dental floss, said body having a passage for a slidable and withdrawable movement of a freely usable unreelable portion of said dental floss in a manner that an in-use portion of said dental floss can be attached to and tautly stretched across the free ends of said tines, a manually applicable and removable adapter detachably mounted on said rearward end and serving to position and replaceably retain said spool in the pocketing recess which is provided therefor, said adapter comprising a substantially U-shaped clip made of resilient strap material and having a longitudinally bowed bight portion spanning the open mouth of said recess in a manner to abut and hold said spool in a given position, one end portion of said clip being fashioned into and providing a keeper hook and the other end portion being fashioned into and providing a latch.

2. The floss holding and using tool defined in and according to claim 1, and wherein, a rearward end portion of the bottom longitudinal surface has an indentation providing a seat for said keeper, the rearward end portion of said upper longitudinal surface having a prescribed depression providing a receiver, said latch having a finger-grip which is normally but removably retained in said receiver.

3. The floss holding and using tool defined in and according to claim 1, and wherein a median area of said upper longitudinal surface is provided with a pair of outstanding L-shaped cleats providing temporarily usable wraparound anchors for temporarily anchorable portions of said dental floss.

4. The floss holding and using tool defined in and according to claim 3 and wherein a median lower portion of said body is externally provided with an attached clip which, in turn, is provided with an outstanding appropriately angled floss severing blade.

5. A dental floss holding tool comprising a handle having forward and rearward end portions, said rearward end portion having a recess opening through the rearward end portion and constituting a spool pocket, said pocket being adapted for insertable and removable reception of a rotatably mountable spool of floss, the body portion of said handle having a passage leading from said pocket, diagonal through a lengthwise edge of the body portion, said body portion having a forward end provided with forwardly diverging opposed normally spread but manually squeezable tines, said tines having free end portions for slidingly and guidingly receiving a stretchable portion of the dental floss which is being used, a median upper edge portion of said body portion being provided with cleats on which portions of the dental floss may be wound and temporarily anchored, said body portion having a rearward end portion provided in a top surface with a shallow depression, provided in a bottom surface with a kerf providing a keeper seat, and, in combination, a bodily attachable and detachable adapter comprising a resilient clip having a bight portion bridging an open side of said pocket, having a lower arm provided with a keeper hook releasably engageable with said keeper seat and having an upper arm terminating in a latch, said latch being retentively seatable in said depression.

6. The dental floss holding tool defined in claim 5 and wherein said clip is U-shaped and also wherein said latch is shaped and so seated and normally retained in said depression that it is readily accessible for manually grippable actuation.

* * * * *